US012730047B2

(12) United States Patent
Van Den Bossche

(10) Patent No.: US 12,730,047 B2
(45) Date of Patent: Sep. 8, 2026

(54) IMPACT DEVICE FOR IMPACT EXCITATION MEASUREMENTS

(71) Applicant: GRINDOSONIC BV, Leuven (BE)

(72) Inventor: Alex Van Den Bossche, Neerijse (BE)

(73) Assignee: GRINDOSONIC BV, Leuven (BE)

( * ) Notice: Subject to any disclaimer, the term of this patent is extended or adjusted under 35 U.S.C. 154(b) by 292 days.

(21) Appl. No.: 18/707,374

(22) PCT Filed: Nov. 10, 2022

(86) PCT No.: PCT/EP2022/081437
§ 371 (c)(1),
(2) Date: May 3, 2024

(87) PCT Pub. No.: WO2023/083944
PCT Pub. Date: May 19, 2023

(65) Prior Publication Data

US 2024/0426724 A1 Dec. 26, 2024

(30) Foreign Application Priority Data

Nov. 15, 2021 (EP) .................................... 21208250

(51) Int. Cl.
*G01N 3/307* (2006.01)

(52) U.S. Cl.
CPC ..... *G01N 3/307* (2013.01); *G01N 2203/0035* (2013.01)

(58) Field of Classification Search
CPC ... G01N 2203/0035; G01N 2203/0039; G01N 3/00–40
See application file for complete search history.

(56) References Cited

U.S. PATENT DOCUMENTS

2014/0260526 A1* 9/2014 Tsutsui .................. G01L 5/0038 73/12.01
2016/0091375 A1* 3/2016 Belzacq ................ A61F 2/0063 73/804

(Continued)

FOREIGN PATENT DOCUMENTS

CN 102435676 A 5/2012
EP 2824440 A1 1/2015

(Continued)

OTHER PUBLICATIONS

Extended European Search Report from corresponding EP Application No. 21208250.7, Apr. 19, 2022.

(Continued)

*Primary Examiner* — Fatemeh Esfandiari Nia
(74) *Attorney, Agent, or Firm* — WORKMAN NYDDEGER

(57) ABSTRACT

An impact device for imparting an impulse impact to a work piece during an impact excitation measurement, includes an elongated elastic bendable arm which is elastically deformable around a bending direction, and has a proximal longitudinal end and a distal longitudinal end; a hammer tip for mechanically providing an impact to the work piece, and attached to the distal end of the arm; and a programmable actuator attached to the proximal longitudinal end of the arm. The actuator is programmed to provide an angular velocity to the proximal longitudinal end of the arm by rotating the proximal longitudinal end around an actuator axis, which is essentially parallel to the bending direction of the arm, the angular velocity following a predefined angular velocity profile. The angular velocity profile is configured to provide an impulse impact to the work piece.

13 Claims, 3 Drawing Sheets

(56) References Cited

U.S. PATENT DOCUMENTS

| | | | | |
|---|---|---|---|---|
| 2019/0003941 | A1* | 1/2019 | Wikswo .................. | G01N 3/20 |
| 2019/0086309 | A1* | 3/2019 | Brandt .................... | A42B 3/04 |

FOREIGN PATENT DOCUMENTS

| | | | | |
|---|---|---|---|---|
| EP | 3435044 | A1 * | 1/2019 | ............. G01H 17/00 |
| EP | 3658868 | A1 | 6/2020 | |
| WO | 2020254698 | A1 | 12/2020 | |

OTHER PUBLICATIONS

International Search Report from corresponding PCT Application No. PCT/EP2022/081437, Feb. 10, 2023.

* cited by examiner

IMPACT DEVICE FOR IMPACT EXCITATION MEASUREMENTS

TECHNICAL FIELD

The present invention concerns an improved hammer for delivering an impact to a work piece when performing impact excitation measurements. Hence, the invention pertains to the field of impact excitation measurements wherein information about the work piece is obtained by measuring and analysing the vibrational response to a mechanical impact, in particular an impulse impact. The impulse impact is provided by means of a hammer.

BACKGROUND

The impact excitation technique for characterising work pieces is known from the following documents:

Document EP3658868A1 discloses an apparatus for analyzing a mechanical vibratory response of a solid material sample, the apparatus comprising: an array of impactors arranged to impart an impact on respective well-defined points on the surface of said solid material sample; a sensor configured to capture said mechanical vibratory response as a time-varying signal, subsequent to an impact of said at least one impactor; and processing means configured to analyze said time-varying signal to determine the frequencies and decay constants of sinusoids making up said time-varying signal. The invention also pertains to a corresponding method of characterizing a solid material sample.

Document WO2020254698A1 discloses a method for acoustically measuring material properties of a test piece at high temperatures, comprising the steps of: a. heating the test piece to within a testing temperature range; b. performing a background measurement within said testing temperature range by capturing a vibrational signal from the test piece within a calibration period, thereby obtaining a noise signal; c. performing an acoustic measurement on said test piece within said testing temperature range and within a testing period by: c1. imparting a vibrational excitation onto the test piece; c2. capturing a vibrational signal of the test piece within the testing period, thereby obtaining a vibrational response signal to said vibrational excitation, and d. obtaining the material properties of the test piece by analysing the vibrational response signal, thereby taking into account the noise signal. The present invention also concerns a system for acoustically measuring material properties of a test piece at high temperatures.

Both prior art documents in name of the current applicant are concerned with methods and apparatus for performing the impact excitation (IE) measurements.

The IE technique basically consists of providing an impact to a work piece and obtaining and analysing the vibrational response signal. This signal is also referred to as an acoustic response signal. The response signal can be captured via a number of ways, including by using a microphone, a piezoelectric displacement sensor and/or a laser interferometer.

The impact provided to the work piece should be as clean as possible to reduce noise signals. In principle, one would like to impart an impulse impact to the work piece using an impact providing mechanism which does not make any noise of its own. The impact providing mechanism typically comprises an impactor which mechanically imparts the impact to the work piece, and an impactor actuator which provides the kinetical energy to the impactor for imparting the impact. In prior art, use is made of a ballistic impactor: such a ballistic impactor is provided with a momentum by the impactor actuator after which the impactor follows at least for a short period a ballistic trajectory before impacting on the work piece. After impact, the ballistic impactor again may follow a ballistic trajectory before being recaptured. Using a ballistic impactor has the advantage of allowing an impact which is essentially an impulse impact, i.e. a very short contact period wherein kinetic energy of the impactor is transferred mechanically to the work piece. In practice, noise may arise due to:

- multiple impact: the impactor contacts the work piece two or more times, for instance because the inertia of the impactor allows the work piece surface to vibrate faster than the impactor withdraws from the work piece. For a ballistic impactor, this also means that the impact if preferably provided from below the work piece such that the impactor does not bounce twice or more against the work piece.
- the impactor may make noise when being actuated, typically due to friction between the impactor and the impactor actuator. For a ballistic impactor, the impactor actuator may comprise a barrel or a guide to ensure that the ballistic impactor is provided with a velocity in the correct direction. Friction with the barrel or guide may cause noise.
- the impactor may make noise after impact, e.g. by touching other parts of the apparatus or when being recaptured in the case of a ballistic impactor.

In the above mentioned prior art documents, a ballistic impactor was disclosed as a preferential impactor, allowing an impulse impact. However, the inventors have found that a ballistic impactor may not always be the best solution. In particular, a ballistic impactor and the impactor actuator may not always be easily adapted to be used with different types of work pieces. Furthermore, the ballistic impactor is best used from below to reduce the chance of multiple impacts, which thus may prohibit impacting the work piece from different sides and/or directions. Note that this may be required if one wants to excite or enhance different vibrational nodes in the work piece.

The present invention aims to provide an impact providing mechanism which:

- is easily adaptable for providing an impulse impact to a work piece of any type of material, geometry, size, etc.,
- can be easily positioned or repositioned to impart an impact to the work piece on a different side and/or along a different direction,
- reduces noise, in particular by basically eliminating the chance of multiple impact and by reducing noise due to friction or recapturing of the impactor.

Thereto, the present invention concerns an improved impact device for performing IE measurements on a work piece as well as a method for operating the impact device. The impact device is preferable used in an impulse excitation measurement apparatus and the present invention therefore also concerns an IE measurement apparatus comprising the impact device.

SUMMARY OF THE INVENTION

The present invention relates to an impact device, an impacting method and an impact device kit for providing an impulse impact to a work piece for performing an impact excitation measurement. The present invention also relates to an IE measurement system and method for performing an impact excitation measurement on a work piece using the impact device and/or the method of the present invention.

Further embodiments of the present invention are disclosed in the dependent claims and in the description of the present document.

It should be noted that the impact device, impact method, IE system and IE method are interrelated, i.e. that the impact method can be executed by the impact device, and both can be used by the IE system and IE method of the present invention. This also means that features which are disclosed in the present document can be applied to all aspects of the present invention.

The present invention is particularly suitable to provide an impulse impact to a work piece without or with limited noise, allowing clean IE measurements to be performed. Furthermore the invention leads to a cheap solution for the impact device and allows easy replacement in case of degradation or in case of a necessity of altering the characteristics of the impact device, and in particular of the arm and of the hammer tip thereof, in function of the work piece and/or the IE measurement setup.

OVERVIEW OF THE FIGURES

FIG. 1 shows an impact device according to the present invention.

FIGS. 2A-D illustrate the impact method and impact device according to the present invention.

DETAILED DISCUSSION OF THE INVENTION

Figure 1:
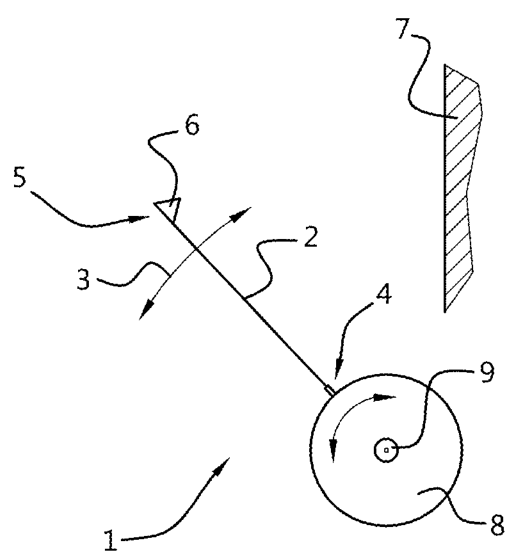

The invention will now be discussed in more detail with reference to the figures which serve to illustrate the invention.

Hence, the present invention concerns an impact device for imparting an impulse impact to a work piece during an impact excitation measurement.

An impact excitation measurement method and system is described in patent applications EP3658868A1 and WO2020254698A1. An IE typically corresponds to providing a mechanical impact to a work piece in a controlled environment such as in a laboratory. The work piece can basically be any type of work piece, including, but not limited to:

- metal work pieces comprising or made of a metal or alloy, preferably wherein the metal may comprise iron, aluminum, zinc, cupper, steel, etc.
- plastics, such as polymer materials
- 3D-printing materials, preferably metals, ceramics or polymers such as polyetheretherketone (PEEK) or Polyetherimide (such as ULTEM™)
- composites, such as composite of plastics and metal.

Most preferably, the work piece is a 3D printed work piece and/or the method of the present invention comprises the step of 3D printing the work piece.

The device (1) comprises:

- an elongated elastic bendable arm (2) which is elastically deformable around a bending direction (3), the bendable arm comprising a proximal longitudinal end (4) and a distal longitudinal end (5);
- a hammer tip (6) for mechanically providing an impact to the work piece (7), the hammer tip attached to the distal end (5) of the arm, and
- a programmable actuator (8) attached to the proximal longitudinal end (4) of the arm (2), whereby the actuator (8) is programmed to provide an angular velocity to the proximal longitudinal end (4) of the arm by rotating said proximal longitudinal end (4) around an actuator axis (9) which is essentially parallel to the bending direction (3) of the arm, the angular velocity following a predefined angular velocity profile, whereby said angular velocity profile is configured to provide an impulse impact to the work piece.

The term "impulse impact" herein refers to a single elastic bounce being provided to the word piece wherein energy is transferred during a short contact period between the hammer tip and the work piece.

As a result of the angular velocity profile, the hammer tip follows a hammer tip trajectory which is configured such that the hammer tip provides the impulse impact to the work piece. Preferably, the hammer tip trajectory starts at a positional offset with respect to the work piece. The hammer tip trajectory is thus dependent, and preferably solely dependent, on said positional offset, the angular velocity profile and the bending characteristics of the bendable arm.

Note that in FIGS. 1 and 2A-D, the bending direction and the actuator axis are shown perpendicular to the page. Note also that the bending direction refers to the direction around which the arm can be bent.

The flexible arm preferably comprises a strip-like shape, having a length L along a longitudinal direction, a width W and a thickness T, whereby L>W>T. The tip (6) being attached to the distal end (5) of the arm (2). Preferably the arm and hammer tip are monolithic. Preferably the arm and/or hammer tip comprise or are made of a plastic, a metal, an alloy, or a combination thereof. Most preferably the arm and hammer tip are monolithic and made of a plastic. The shape of the arm and the material properties of the arm are preferably selected to ensure the bendability of the arm around a bending direction perpendicular to the longitudinal direction, more preferably the width direction and most preferably the shape of the arm and the material properties of the arm are selected to ensure the bendability of the arm around only the width direction, i.e. the arm thus bends only around the width direction during the execution of the angular velocity profile.

In a preferred embodiment, the actuator comprises an electrical motor, more preferably a rotary electrical motor. The electrical motor preferably comprises a rotor which is attached to the proximal end of the bendable arm such that the angular velocity profile of the proximal end of the bendable arm can be determined by the rotor of the electrical motor.

Figure 2A:
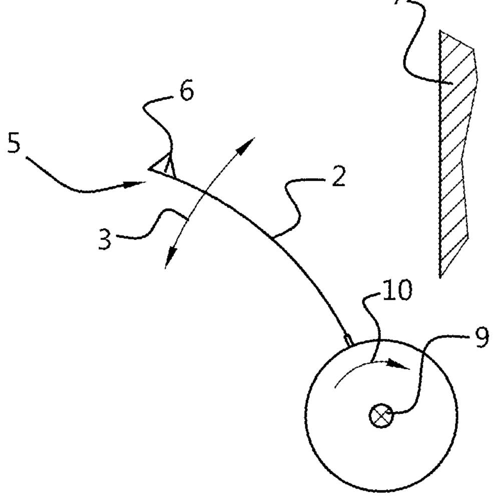
Figure 2B:
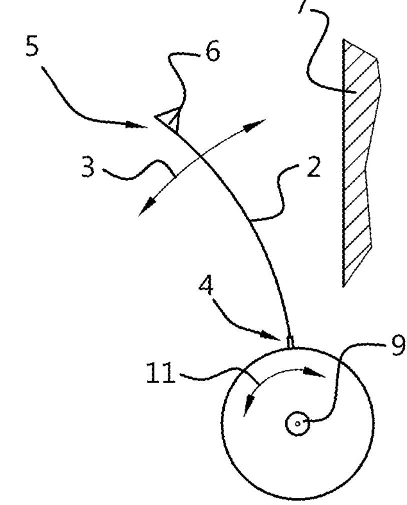
Figure 2C:
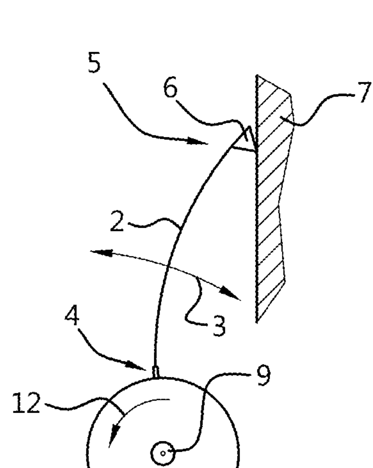
Figure 2D:
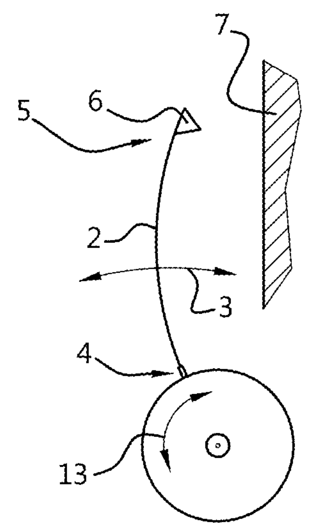
Figure 3:
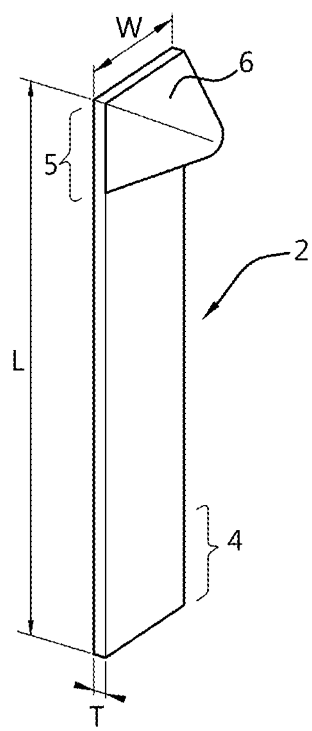
FIG. 3 illustrates an embodiment of the arm in accordance with the present invention.

In a preferred embodiment, the angular velocity profile comprises a turning point at which the angular velocity provided to the distal longitudinal end of the arm changes sign, said turning point being earlier than the impact to the work piece. This is particularly preferred to ensure that an impulse impact is provided to the work piece by a whiplash-like movement of the hammer tip. The working hereof is illustrated in FIGS. 1 and 2A-D. In FIG. 1, the situation at the start of the method is shown, wherein the flexible arm (2) is basically at rest and straight or only slightly bent (e.g. because of the flexible arm's and the hammer tip's own weight). The actuator then starts executing the angular velocity profile. In FIG. 2A, the angular velocity (10) is such that the proximal end of the arm is rotated towards the work piece (7). Due to the inertia of the arm and the hammer tip, the bendable arm bends around the bending direction (3), thereby curving the flexible arm. The angular velocity profile then comprises a turning point wherein the angular velocity (11) imposed on the proximal end (4) of the flexible arm is essentially zero. At the turning point (see FIG. 2B), the actuator stops rotating the longitudinal end (4) of the arm (2). However, due to the curving of the arm and the elasticity thereof, the hammer tip remains moving towards the work piece. At the moment of impact to the work piece (see FIG. 2C), the actuator is already imposing an angular velocity (12) to the proximal end (4) of the arm away from the work piece, ensuring that after impact, the hammer tip does not impact multiple times on the work piece. This is shown in FIG. 2D, wherein the actuator has stopped (13) rotating the proximal end of the arm. Hereby, the hammer tip is moving away from the work piece and is allowed to come back to rest in accordance with the situation in FIG. 1, ready to start again for the follow-up measurement.

Preferably, the programmable actuator comprises a programmable computing unit, more preferably an Arduino computing unit or a raspberry pi computing unit. The programmable computing unit can be configured to control an electrical motor, preferably a rotary electrical motor, and can be programmed to steer the electrical motor to essentially follow the angular velocity profile.

Figure 4:
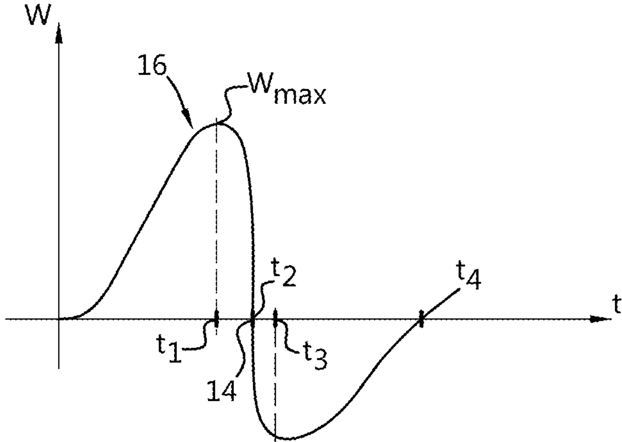
FIGS. 4 and 5 illustrate angular velocity profiles in accordance with the present invention.

FIG. 4 illustrates an angular velocity profile (16) in accordance with the present invention. The angular velocity profile preferably starts from rest ($\omega=0$ at $t=0$) and continuously increases up to a maximum angular velocity ($\omega_{max}$) at a time $t_1$. Note that in the figure, a positive angular velocity indicates rotation of the longitudinal proximal end of the arm towards the work piece, and a negative angular velocity indicates rotation of the longitudinal proximal end of the arm away from the work piece. The angular velocity profile comprises a turning point (14) at time $t_2$. At a moment $t_3$, which is later than $t_2$, the hammer tip impacts upon the work piece with a single elastic bounce. At this moment $t_3$, the angular velocity is negative, indicating a rotation away from the work piece of the proximal end of the arm. At moment $t_4$, the actuator comes back to rest ($\omega=0$).

Note that the turning point (14) in the angular velocity profile refers to the moment where the angular velocity changes sign, in particular from positive to negative, i.e. from turning towards the work piece to turning away from the work piece.

Figure 5:
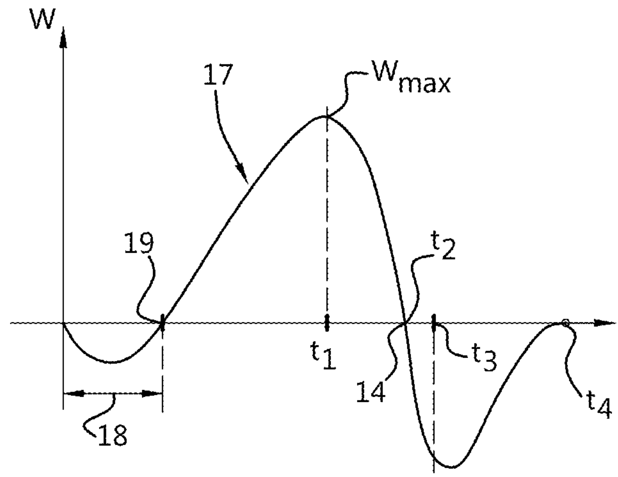

FIG. 5 illustrates another angular velocity profile (17) in accordance with the present invention. The angular velocity profile preferably starts from rest ($\omega=0$ at $t=0$). Contrary to the embodiment illustrated in FIG. 4, the angular velocity is negative during a first period (18), which ends at a second turning point (19), the second turning point (19) referring to the point where the angular velocity changes sign from negative to positive, i.e. from turning away from the work piece to turning towards the work piece. After the first period (18), the angular velocity basically follows a similar profile as illustrated in FIG. 4, i.e. the angular velocity continuously increases up to a maximum angular velocity ($\omega_{max}$) at a time $t_1$. The angular velocity profile comprises a turning point (14) at time $t_2$. At a moment $t_3$, which is later than $t_2$, the hammer tip impacts upon the work piece with a single elastic bounce. At this moment $t_3$, the angular velocity is negative, indicating a rotation away from the work piece of the proximal end of the arm. At moment $t_4$, the actuator comes back to rest ($\omega=0$).

Preferably the arm is attached to the actuator in a replaceable manner, allowing the arm and/or hammer tip to be easily replaced, e.g. in case of degradation of the tip or in the case another type of arm and/or hammer tip is required for performing the IE measurement. For instance, the arm and/or tip may be exchanged for another arm and/or tip which have different elastic properties, in particular other bendability properties. Another reason to replace the arm and/or hammer tip is when a work piece needs to be impacted upon by another type of hammer tip, for instance when a harder or softer tip is required, or a tip of a different material (e.g. metal instead of plastic) is required for optimal IE measurements for a specific work piece. In this respect it may be noted that for a metal work piece, one may want to use a hard hammer tip, whereas for a work piece made from a 3D printing material, a plastic hammer tip may be preferred. Hence, the present invention may be used for testing different work pieces. Hereto, the present invention comprises an impact device kit comprising:

- a set of elongated elastic bendable arms, each of which is elastically deformable around a bending direction, the bendable arm comprising a proximal longitudinal end and a distal longitudinal end;
- a set of hammer tips for mechanically providing an impact to the work piece, each of the hammer tips attachable, and preferably attached to, to the distal end of an arm of the set of elongated elastic bendable arms, and
- a programmable actuator attachable to the proximal longitudinal end of each of the arms in a replaceable manner, whereby the actuator is programmed to provide an angular velocity to the proximal longitudinal end of an operational arm when the actuator is attached to the proximal longitudinal end of said operational arm, by rotating said proximal longitudinal end around an actuator axis which is essentially parallel to the bending direction of the operational arm, the angular velocity following a predefined angular velocity profile, whereby said angular velocity profile is configured to provide an impulse impact to the work piece.

The present invention further relates to an impact excitation (IE) measurement system for measuring the vibrational response of a work piece to an impulse impact, comprising:

- an impact device according to the present invention;
- a response recording device for capturing a vibrational response of the work piece to the impulse impact;
- a control unit for controlling the actuator of the impact device and the response recording device, and
- a support device for holding the work piece in pre-defined location.

The present invention also relates to an impact excitation (IE) measurement method for measuring the vibrational response of a work piece to an impulse impact comprising the steps of:

- supporting a work piece in a pre-defined location;
- imparting an impulse impact to a work piece according to an impact method according to the present invention, and
- capturing a vibrational response of the work piece to the impulse impact,
- thereby measuring the vibrational response of the work piece to the impulse impact.

Herein, the response recording device may preferably comprise a microphone, a piezoelectric displacement sensor and/or a laser interferometer to capture the vibrational response. The response recording device also preferably comprises a processing unit and/or a memory unit for recording and/or analysing the vibrational response.

The work piece needs to be supported in a pre-defined location, whereby said pre-defined location preferably is selected taking into account the angular velocity profile and/or the whereby the angular velocity profile is selected taking into account the pre-defined location.

The invention claimed is:

1. An impact device for imparting an impulse impact to a work piece during an impact excitation measurement, the device comprising:

an elongated elastic bendable arm which is elastically deformable around a bending direction, the bendable arm comprising a proximal longitudinal end and a distal longitudinal end;

a hammer tip for mechanically providing an impact to the work piece, the hammer tip attached to the distal end of the arm, and a programmable actuator attached to the proximal longitudinal end of the arm, wherein the actuator is programmed to provide an angular velocity to the proximal longitudinal end of the arm by rotating said proximal longitudinal end around an actuator axis which is essentially parallel to the bending direction of the arm, the angular velocity following a predefined angular velocity profile, wherein said angular velocity profile is configured to provide an impulse impact to the work piece.

2. The impact device according to claim 1, wherein the angular velocity profile comprises a turning point at which the angular velocity provided to the distal longitudinal end of the arm changes sign, said turning point being earlier than the impact to the work piece.

3. The impact device according to claim 1, wherein the flexible arm comprises a strip-like shape, having a length L along a longitudinal direction, a width W and a thickness T, wherein L>W>T, the hammer tip being attached to the distal end of the arm.

4. The impact device according to claim 3, wherein the bendable arm and hammer tip are monolithic.

5. The impact device according to claim 1, wherein the actuator comprises a rotary electrical motor and a programmable computing unit which is configured to control the rotary electrical motor, and which programmable computing unit is programmed to steer the rotary electrical motor to essentially follow the angular velocity profile.

6. The impact device according to claim 1, wherein the arm is attached to the actuator in a replaceable manner.

7. An impacting method for imparting an impulse impact to a work piece during an impact excitation measurement using an impact device comprising:

an elongated elastic bendable arm which is elastically deformable around a bending direction, the bendable arm comprising a proximal longitudinal end and a distal longitudinal end;

a hammer tip for mechanically providing an impact to the work piece, the hammer tip attached to the distal end of the arm, and the method comprising the step of providing an angular velocity to the proximal longitudinal end of the arm by rotating said proximal longitudinal end around an actuator axis which is essentially parallel to the bending direction of the arm, the angular velocity following a predefined angular velocity profile, wherein said angular velocity profile is configured to provide an impulse impact to the work piece.

8. A method according to claim 7, wherein the angular velocity profile comprises a turning point at which the angular velocity provided to the distal longitudinal end of the arm changes sign, said turning point being earlier than the impact to the work piece.

9. The method according to claim 7, wherein the work piece is a 3D printed work piece.

10. The method according to claim 9, wherein the work piece is made of metal.

11. An impact device kit for mounting an impact device according to claim 1, comprising:

a set of elongated elastic bendable arms, each of which is elastically deformable around a bending direction, the bendable arm comprising a proximal longitudinal end and a distal longitudinal end;

a set of hammer tips for mechanically providing an impact to the work piece, each of the hammer tips attachable, and attached to, to the distal end of an arm of the set of elongated elastic bendable arms, and a programmable actuator attachable to the proximal longitudinal end of each of the arms in a replaceable manner, wherein the actuator is programmed to provide an angular velocity to the proximal longitudinal end of an operational arm when the actuator is attached to the proximal longitudinal end of said operational arm, by rotating said proximal longitudinal end around an actuator axis which is essentially parallel to the bending direction of the operational arm, the angular velocity following a predefined angular velocity profile, wherein said angular velocity profile is configured to provide an impulse impact to the work piece.

12. An impact excitation measurement system for measuring the vibrational response of a work piece to an impulse impact, comprising:

an impact device according to claim 1;

a response recording device for capturing a vibrational response of the work piece to the impulse impact;

a control unit for controlling the actuator of the impact device and the response recording device, and a support device for holding the work piece in pre-defined location.

13. The impact excitation measurement method for measuring the vibrational response of a work piece to an impulse impact comprising the steps of:

supporting a work piece in a pre-defined location;

imparting an impulse impact to a work piece according to the impacting method of claim 7, and capturing a vibrational response of the work piece to the impulse impact, thereby measuring the vibrational response of the work piece to the impulse impact.

* * * * *